United States Patent Office 2,900,589
Patented Aug. 18, 1959

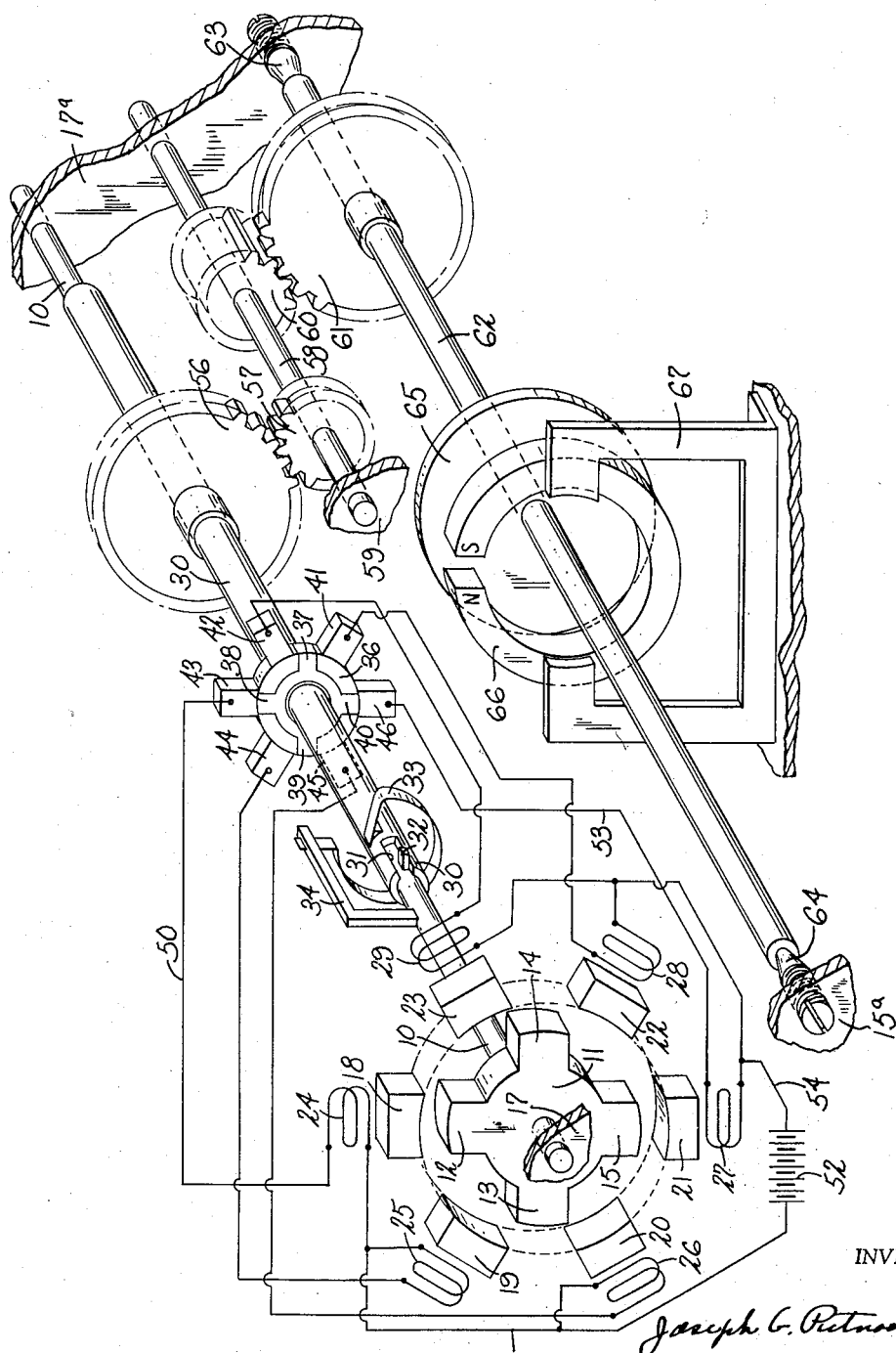

2,900,589

MAGNETIC GOVERNOR-CONTROLLED CONSTANT-SPEED MOTOR

Joseph G. Putnocky, Jr., Fairfield, Conn.

Application October 28, 1957, Serial No. 692,655

7 Claims. (Cl. 318—254)

This invention relates to electric motors and more particularly to a constant-speed magnetic motor controlled by a magnetic governor. One feature of the invention resides in the fact that the braking action of the governor does not act directly on the rotor of the electric motor but acts instead on the commutator which electrically controls the speed of the rotor, the commutator and magnetic governor receiving a power feedback from the commutator to keep them in motion. The motor illustrated in the present application is similar to that of my Patent 2,624,017, granted December 30, 1952.

In the modification of the invention illustrated in the drawings, the shaft of the rotor is resiliently connected to a commutator shaft which electrically controls the speed of the rotor. In turn this commutator shaft drives the shaft of a magnetic governor which includes a rotating disk of electrically conductive material and a cooperating fixed horseshoe magnet. Means are provided to adjust the air gap between the disk and the magnet so that the speed of the motor may be regulated. It will be understood that while the magnet is illustrated as stationary and the cooperating disk as rotating, it will be understood that the magnet may rotate and the disk be stationary if desired.

One object of the invention is to provide a constant-speed motor of improved construction.

Still another object of the invention is to provide a magnetic motor wherein the speed of the motor is controlled by a magnetic governor receiving a power feedback from the motor itself.

The drawing represents an exploded oblique view of the motor and magnetic governor.

To illustrate a preferred embodiment of the invention there is shown in the drawings a motor shaft 10 carrying a rotor 11 having poles 12, 13, 14 and 15. The rotor shaft may be rotatably supported in a frame shown fragmentarily at 17 and 17ª. The rotor also comprises field poles 18, 19, 20, 21, 22 and 23 which are energized respectively by windings 24, 25, 26, 27, 28 and 29. It will be observed that while there are four of the rotor poles there are six of the field poles, which arrangement gives an intermittent rotating increment of 30 degrees from one line-up of a rotor pole and field pole to the next.

A sleeve shaft 30 is rotatably supported for limited rotating movement upon the shaft 10, this sleeve shaft being provided with a slot 31 within which is received a pin 32 secured to the shaft 10. As the pin is smaller than the slot 31 limited or restricted relative rotation of the shafts 10 and 30 is permitted.

The shaft 30 is connected to the shaft 10 by a torsion spring 33 secured at one end to the sleeve shaft 30 and at the other end to an arm 34 secured to the shaft 10. This spring is tensioned so as to tend to rotate the shaft 30 in a clockwise or right-hand direction when the observer faces the rotor 11, as viewed from the member 17. It will be understood that the lost-motion or loose connection between the shafts 10 and 30 will allow relative rotation between the shafts equal to the increment of 30 degrees between the field poles and rotor poles of the motor.

Secured to the shaft 30 is a commutator drum 36 having contact segments 37, 38, 39 and 40. Cooperating with these segments or strips are brushes 41, 42, 43, 44, 45 and 46. It will be noted that the commutator drum has as many contact segments or strips as there are rotor poles and that all of the segments are electrically connected together but insulated from the shaft 30. Also there are as many brushes as there are field windings of the motor stator, six, as shown.

Each of the brushes is connected to one of the field windings. As shown, the brush 43 is connected to the field winding 24 by the wire 50 and this field winding is also connected by the wire 51 to a source of current 52. The commutator brush 46, which is opposite the brush 43, is connected to the field winding 27 by the wire 53 and connected to the source of current by the wire 54. The same arrangement is followed with the other brushes and field windings.

As is evident from the drawing, there is a zero phase between the commutator brushes and the corresponding field windings and when the motor and commutator are connected to the source of current 52 two opposite field windings will be energized, such as 24 and 27, the circuit being completed through commutator segments 38 and 40 and brushes 43 and 46 so that the rotor poles 12 and 15 will be held by the field poles 18 and 21. When, however, the shaft 30 is rotated through the increment of 30 degrees in the above-mentioned clockwise direction by the spring 33, or the power feed back, field poles 19 and 22 will be magnetized by coils 25 and 28, poles 21 and 18 de-energized, and the rotor will rotate in a clockwise direction to align the poles 13 and 14 with the field poles 19 and 22. The above operation is similar to that in my patent previously referred to.

Secured to the shaft 30 is a gear 56 meshing with a gear 57 on a counter-shaft 58 rotatably supported in frames 17ª and 59. Also secured to this shaft is a wide-faced gear 60, the teeth of which mesh with a gear 61 secured to a shaft 62. The shaft 62 is supported upon cone bearing screws 63 and 64 threaded respectively into frame parts 17ª and 15ª. With this arrangement the shaft 62 may be adjusted longitudinally of its axis by means of the adjustment of the bearing screws. A disk 65 of any electrically conductive material, either ferrous or non-ferrous, is secured upon the shaft 62 so as to rotate with this shaft and cooperate with a circular horseshoe magnet 66 secured to a stationary frame 67. An air gap is provided between the magnet 66 and the disk 64 and it will be apparent that adjustment of the shaft 62 will adjust the width of this air gap.

When the disk rotates the magnetic lines of force cut the disk and induce currents in it. As the magnet is fixed this brings about a drag upon the shaft 62 and, consequently, upon the shaft 30 opposing the action of the spring 33.

As the main rotor is set into motion the shaft 30 will also rotate due to the action of the spring 33 so that a power feedback is fed back to shaft 62 through the gears 56, 57, 60 and 61. Rotation of the shaft 62 will cause the lines of force issuing from the magnet to be cut and the rate of rotation of this shaft will be equal to the revolutions' slip. This may be adjusted by varying the air gap between the magnet and disk 65 as previously explained. The controlled speed of shaft 62 will control and regulate the speed of shaft 30 to which is attached a commutator unit which will thus electrically, by its switch action, control the speed of the main rotor and thus control the power output of the motor shaft 10.

While I have shown and described one embodiment of my invention, it will be understood that it is not to be limited to all of the details shown but is capable of modification and variation within the spirit of the invention and the scope of the appended claims.

What I claim is:

1. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, and a magnetic governor connected to the commutator shaft to apply a drag thereto.

2. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, and a magnetic governor connected to the commutator shaft to apply a drag thereto and means for adjusting the force of said drag.

3. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, means to apply a drag to the commutator shaft, said means comprising a third shaft drivingly connected to the commutator shaft, a magnet member, and a disk member of electrically conductive material, one of said members being carried by said third shaft and the other member being fixed and in a position to cooperate with said one member.

4. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, magnetic governor means connected to the commutator shaft to apply a drag thereto, said means including a magnet member and a disk member of electrically conductive material, one of said members being driven by said commutator shaft and the other member being mounted in fixed position in spaced relation to said one member to cooperate therewith.

5. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, magnetic governor means connected to the commutator shaft to apply a drag thereto, said means including a magnet member and a disk member of electrically conductive material, one of said members being driven by said shaft and the other being mounted in fixed position in spaced relation to said one member to cooperate therewith and means for adjusting the spacing between said members.

6. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, means to apply a drag to the commutator shaft, said means comprising a third shaft drivingly connected to the commutator shaft, a magnet member, a disk member of electrically conductive material, one of said members being carried by said third shaft and the other being fixed and in a position to cooperate with said one member, said magnet and disk members being in spaced relation to each other, and means for adjusting said third shaft longitudinally of its axis to adjust the spacing between said members.

7. A magnetic governor controlled motor comprising a rotatably mounted armature shaft, an armature, having salient poles, on said shaft, field coils of a greater number than said armature poles cooperating with the latter to drive the shaft, a commutator shaft having a resilient driving connection with said armature shaft, a commutator on the commutator shaft electrically connected to said field coils to energize the latter, a source of current, electrical connection between said source of current, the commutator, and the field coils, said commutator comprising a number of segments and an unequal number of brushes cooperating therewith, a gear secured to said commutator shaft, a third shaft in parallel spaced relation to the commutator shaft and driven from said gear, a disk of electrically conductive material on said third shaft, a magnet supported in fixed position adjacent to, but spaced from, said disk to apply a drag thereto, and means for adjusting said third shaft longitudinally of its axis to adjust the space between said magnet and disk.

References Cited in the file of this patent

UNITED STATES PATENTS

| 2,149,288 | Green | Mar. 7, 1939 |
| 2,624,017 | Putnocky | Dec. 30, 1952 |